United States Patent [19]
Lee, Jr.

[11] Patent Number: 5,527,059
[45] Date of Patent: Jun. 18, 1996

[54] ADJUSTABLE VEHICLE SUSPENSION

[76] Inventor: Simon Lee, Jr., 2407 Madden Hills Dr., Dayton, Ohio 45408

[21] Appl. No.: 354,719

[22] Filed: Dec. 6, 1994

[51] Int. Cl.⁶ .................................................... B60G 1/00
[52] U.S. Cl. ......................... 280/688; 280/43.23; 446/466
[58] Field of Search ........................... 280/688, 6.1, 840, 280/43.23, DIG. 1; 180/209; 446/466, 469

[56] References Cited

U.S. PATENT DOCUMENTS

| | | | |
|---|---|---|---|
| 3,321,210 | 5/1967 | Delchev | 280/6 |
| 3,533,641 | 10/1970 | Driskill | 280/43.23 X |
| 3,806,141 | 4/1974 | Janer | 280/6.1 |
| 4,390,187 | 6/1983 | Maeda | 280/6.1 |
| 4,730,838 | 3/1988 | Takahashi | 280/688 |
| 5,143,386 | 9/1992 | Uriarte | 280/6.1 |
| 5,306,031 | 4/1994 | Quinn et al. | 280/688 |
| 5,306,038 | 4/1994 | Henderson, Jr. | 280/688 |
| 5,334,077 | 8/1994 | Bailey | 446/466 |

FOREIGN PATENT DOCUMENTS 269683  10/1989  Japan ........................................ 280/688

*Primary Examiner*—Robert J. Oberleitner
*Assistant Examiner*—Peter M. Poon
*Attorney, Agent, or Firm*—Richard C. Litman

[57] ABSTRACT

A remotely operated vehicle height adjustment apparatus for toy or model wheeled vehicles. A motor is provided for each road wheel, the output being reduced in reduction gears. A lever or suspension arm is fixed to the output shaft of the gearset, and is pivotally driven, or angularly displaced. Each road wheel is fixed to the end of one suspension arm, and is raised and lowered relative to the vehicle body when the motor is operated. Inertial and frictional forces within the motor and gearset maintain the vehicle raised or lowered after the motor is deenergized. Wheels are individually controlled, the resultant vehicle attitude mimicking any of several real world vehicle effects, such as acceleration, cornering, and the like. The vehicle is remotely controlled from a switch controlling the various wheels individually, and is connected to the vehicle by communication cables.

5 Claims, 6 Drawing Sheets

ADJUSTABLE VEHICLE SUSPENSION

BACKGROUND OF THE INVENTION

1. Field of the Invention

This invention relates to a vehicle height adjustment device, more particularly a remotely operated, model vehicle height adjustment device.

2. Description of the Prior Art

Young and old alike savor the age old pastime of model making. Model makers' ever increasing zeal to more realistically render their subjects drives them to explore new building materials, tools and techniques. The present invention is one such tool.

The present invention is a device which permits the user to impart a dynamic effect to the user's model vehicle. The invention permits the user to individually raise or lower each individual wheel assembly of the model car being shown. The prior art includes some vehicle suspension adjustment devices, but none which are as versatile and cost effective as the present invention.

U.S. Pat. No. 3,321,210 issued May 23, 1967 to N. Delchev describes a vehicle height adjustment invention which comprises an electronically controlled shock absorber system in which magnetic impulses alter the mechanical properties of the shock to automatically counteract the vehicles' rolling tendencies during certain driving maneuvers. Delchev's height adjustment device does not take advantage of the cost effectiveness and reliability of the prime mover incorporated in the present invention.

U.S. Pat. No. 3,806,141 issued Apr. 23, 1974 to J. L. J. Janer describes a vehicle attitude adjustment invention which comprises two sets of parallelogram arrangements of bars, one set to maintain the drive wheels parallel to each other and the line of gravitational force, and a similar arrangement for the steering wheels. As with Delchev's invention, Janer's invention does not employ prime movers like those employed in the present invention to execute attitude adjustment nor does Janer's invention permit the user to adjust each wheel independent of the other wheels as in the instant invention.

U.S. Pat. No. 4,390,187 issued Jun. 28, 1983 to K. Maeda describes a vehicle leveling system which comprises air chambers disposed between the vehicle and chassis which are pressurized by a compressor through electromagnetic valves. Maeda's vehicle height adjustment invention also does not take advantage of the simple prime mover and drive system as in the present invention.

U.S. Pat. No. 4,730,838 issued Mar. 15, 1988 to H. Takahashi describes a vehicle leveling system which comprises adjustable shock absorbers that permit the user to increase or decrease the height of the front and/or rear end of the vehicle. Takahashi's invention uses non-resilient retarders, not a simple prime mover and driver combination as in the present invention, and does not allow independent adjustment of each wheel.

U.S. Pat. No. 5,143,386 issued Sep. 1, 1992 to J. Uriarte describes a vehicle adjustment system involving a plurality of telescoping electric jacks. The adjustment speed of each jack is proportional to the amount of adjustment required by the jack to properly level the vehicle. Like the above cited references, Uriarte's invention relies on a telescoping mechanism, rather than a cantilevering convention as in the present invention, and does not permit individual adjustment of each wheel.

U.S. Pat. No. 5,306,031 issued Apr. 26, 1994 to T. N. Quinn et al. describes a vehicle height adjustment system which comprises an electric motor which may be actuated to drive a vertical worm gear which meshes with a threaded member attached to the vehicle's strut mounting plate; as the worm gear rotates in one direction, the mounting plate is raised or lowered depending on the thread configuration of the worm gear and mating member fastened to the mounting plate. Quinn's invention also fails to take advantage of the cantilevering principles of the control arm employed in the instant invention.

Finally, U.S. Pat. No. 5,306,038 issued Apr. 26, 1994 to R. D. Henderson, Jr. describes a vehicle suspension adjustment system which involves an electric motor which winds a cable about a drum mounted to the output shaft of the motor to compress a shock absorber to lower the vehicle. Although Henderson's invention addresses individual adjustment of vehicle at each wheel assembly, Henderson's invention does not involve cantilevering a wheel support member such that the wheel assembly is driven away from the vehicle, thereby elevating the vehicle body from the ground.

None of the above inventions and patents, taken either singly or in combination, is seen to describe the instant invention as claimed.

SUMMARY OF THE INVENTION

The present invention is a remotely operated vehicle height adjustment system which involves prime movers designated for each road wheel assembly, each of which may be individually actuated to angularly displace a suspension arm coupled to the target road wheel assembly such that the relative distance between the target road wheel and the vehicle is altered.

Height control through the arm is preferred over other more complicated schemes, such as that of Henderson, because of the reduced opportunity of individual linkage members to bind. Illustratively, binding could occur as the cable connecting the motor output shaft to the control tube makes a right angled turn. It is also preferred not to have the powered apparatus elevating and lowering the chassis work in opposition to a spring. Both of these features are seen in the Henderson scheme, and both potential sources of trouble are eliminated in the present invention.

In consideration of the above, an object of the invention is to permit the user to adjust the height of a vehicle road wheel independently of the other wheels by actuating a suspension arm which influences the distance between the chassis and the target wheel.

It is a further object of the invention to cause the suspension arm to be driven pivotally from a control wheel.

An additional object is to eliminate binding elements from the linkage elevating and lowering the target road wheel.

Another object of the invention is to permit the user to adjust vehicle height by actuating a suspension arm which influences the distance between the chassis and the target road wheel remotely.

A further object of the invention is to provide improved elements and their arrangement in an apparatus for the purposes described which is inexpensive, dependable and effective.

These and other objects of the present invention will become readily apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
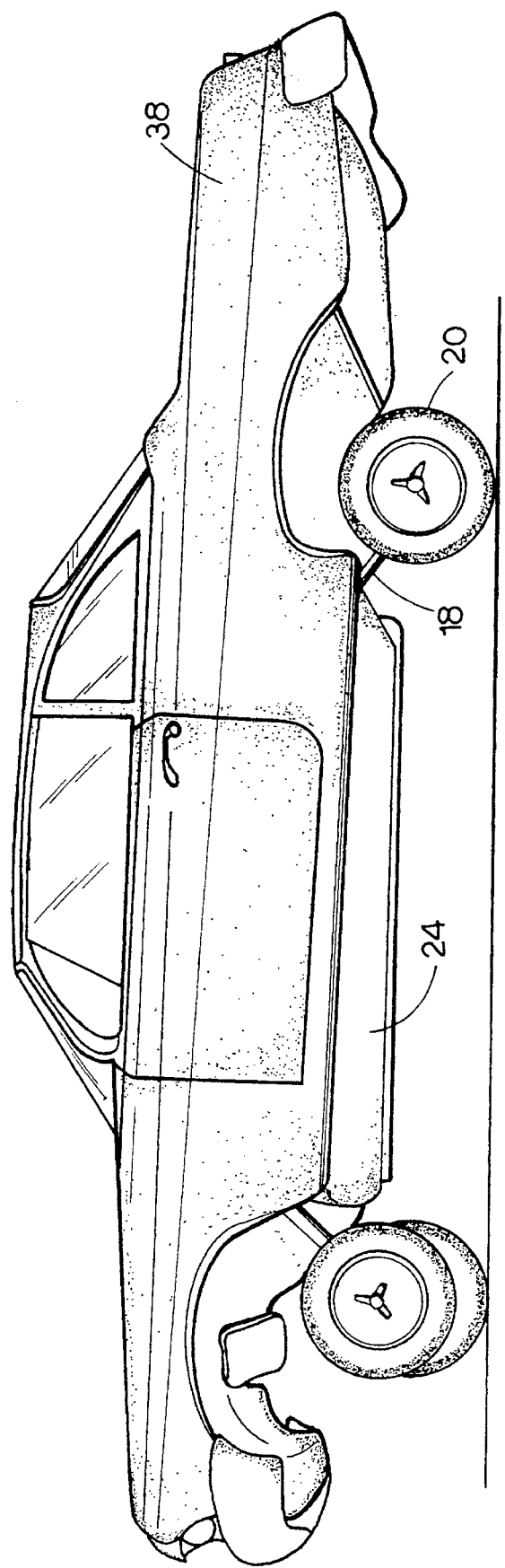
FIG. 1 is an environmental side view of an embodiment of the invention showing a vehicle, wheel support members and road wheel assemblies, and showing the suspension adjusted so that the vehicle is in a three wheel attitude, one wheel completely lifted from a supporting surface.

Referring to FIG. 1, the present invention is a vehicle suspension adjustment apparatus which is shown having imparted on a model vehicle 38 a dynamic component, i.e. an appearance that the vehicle 38 is cornering at great speed. Some other, but not all, possible dynamic impressions are discussed below.

Figure 2:
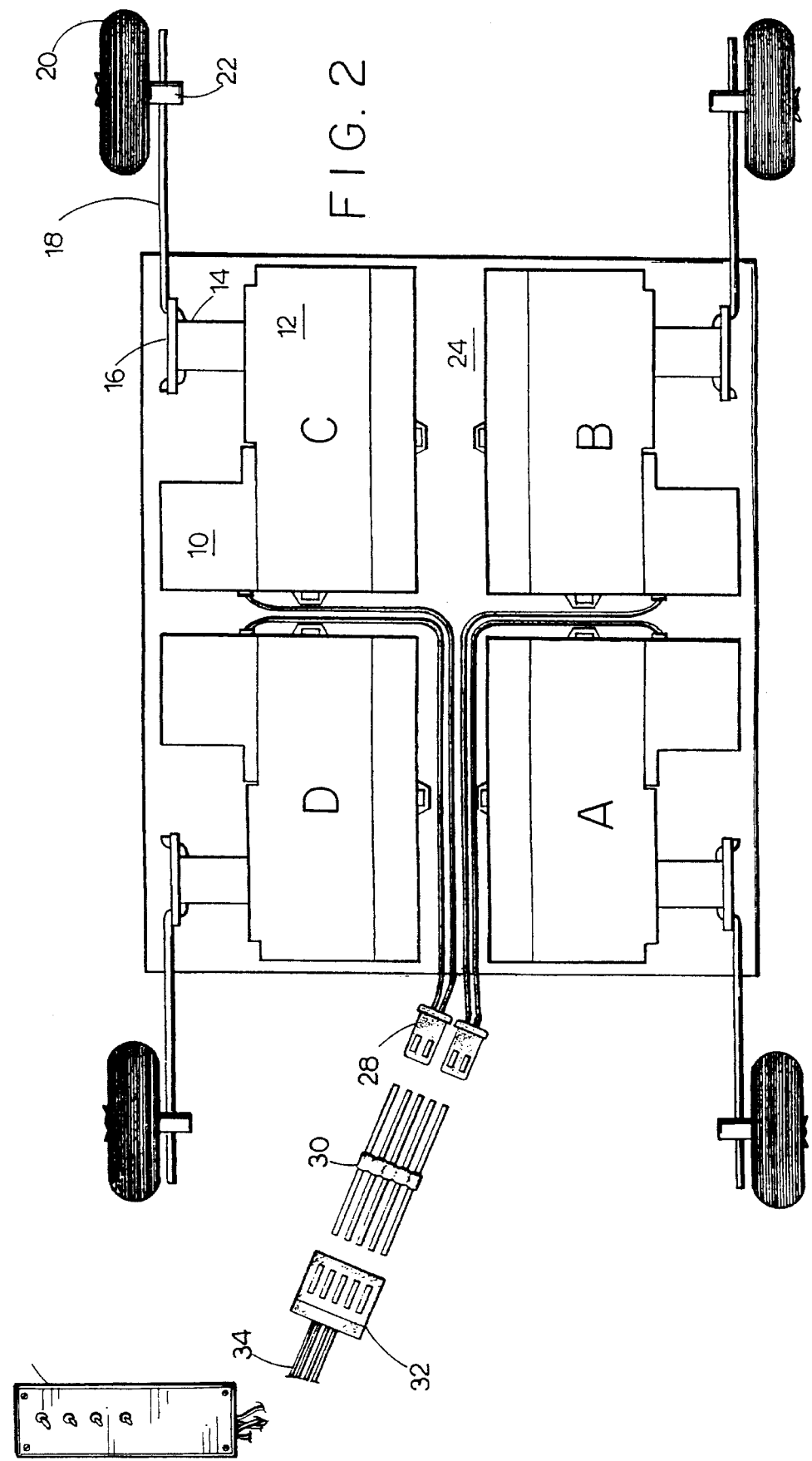
FIG. 2 is a top view of an embodiment of the invention showing a motor, reduction gears, control arm and road wheel.
Figure 3:
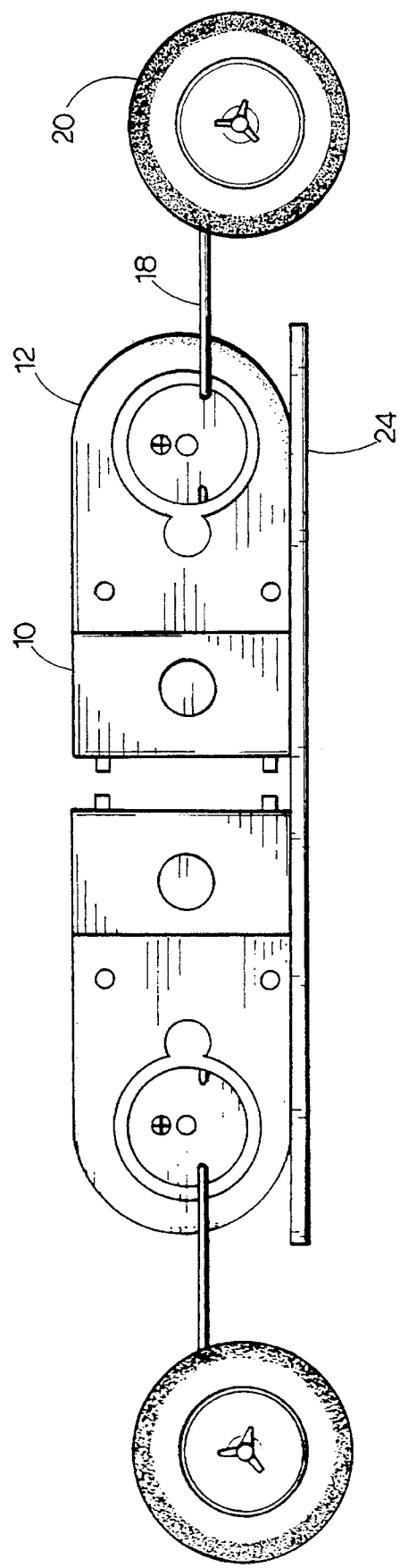
FIG. 3 is a side view of an embodiment of the invention showing a motor, reduction gears, control arm and road wheel.

With respect to the detailed components of the invention, referring to FIG. 2, the present invention is carried out with equipment comprising conventional electric motors 10 and reduction gears 12 which are fixed to a mounting plate 24. Fixed to an output shaft 14 of each reduction gear 12 is a control wheel 16 which is fixed to a first end of a suspension arm 18. The second end of each suspension arm 18 is coupled to a hub 22 which is fixed to a road wheel 20. The user may adjust the relative distance between the wheel 20 and vehicle 38, wheel attitude hereafter, by toggling a switch 36 on the remote control 26 to send a signal via standard electrical conduit 34 to a female connector 32 which detachably accepts double male connectors 30 which also detachably insert into the motor connectors 2S which are connected to the target motor 12 by additional electrical conduits 34. The signal sent actuates the motor 12 to rotate the reduction gears 12 which rotate the output shaft 14 and control wheel 16, which in turn angularly displace the first end of the suspension arm 18. The second end of the suspension arm 18 swings toward or away from the vehicle 38 to alter wheel attitude with respect to targeted area of the vehicle 38. FIG. 3 shows the components as viewed from the side.

Figure 4:
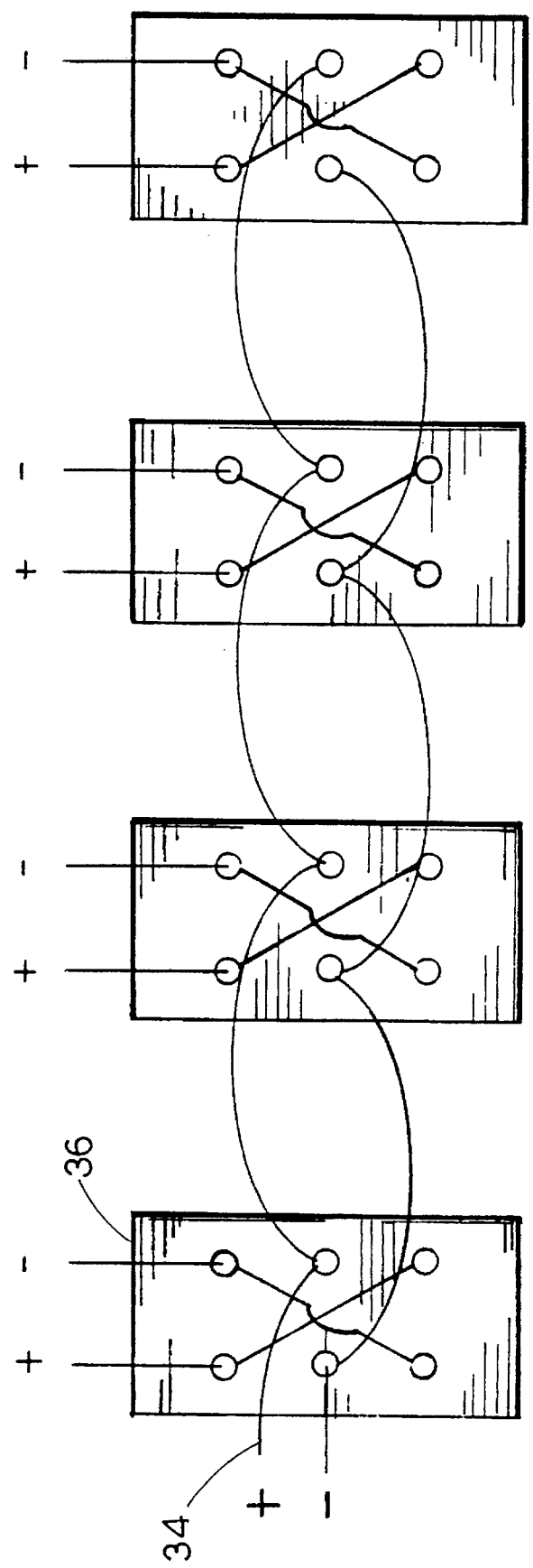
FIG. 4 is a schematic of an embodiment of the switching arrangement found within the remote control.

Within the remote control 26, standard electrical conduit (not shown) leads from a power source (not shown) to, referring to FIG. 4, four parallel, conventional three-way electronic switches 36, each of which controls the energy supplied to a particular motor 10. When a switch 36 is toggled into the first position, the power and polarity of the energy delivered by the completed circuit urges the motor 10 to rotate the reduction gears 12 such that the output shaft 14 rotates the control wheel 16 to angularly displace the suspension arm 18 in a specific rotational direction, which is discussed below. When a switch 36 is toggled into the third position, the power and polarity of the energy delivered by the completed circuit urges the motor 10 to rotate the reduction gears 12 in the opposite direction from the direction in which the first-position circuit urges the motor such that vehicle height is decreased. When a switch 36 is toggled into the second position, the motor is de-energized. Wheel attitude is maintained because friction and inertial forces of the motor resist the moment created by the normal forces experienced by the wheel 20 acting through the moment arm created by the wheel suspension arm 18.

As alluded to above, the direction in which the control wheel 16 rotates depends on where the wheel assembly is located on the vehicle 38. For example, with respect to Assembly A, referring again to FIG. 2, the control wheel 16 would rotate in a counter-clockwise manner when the switch 36 is toggled into the first position, whereas on Assembly B, the control wheel 16 would rotate in a clockwise manner.

Figure 5:
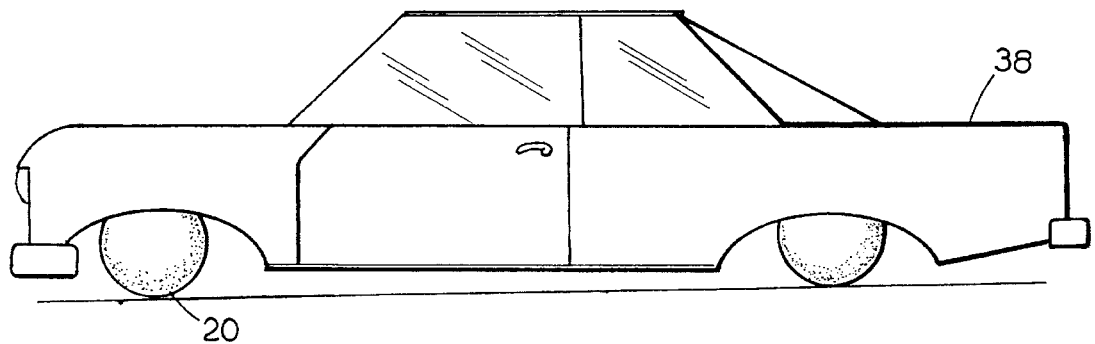
FIG. 5 is a side elevational view of an embodiment of the invention showing a vehicle, wheel support members and road wheel assemblies, with the vehicle in a pancaked attitude.
Figure 6:
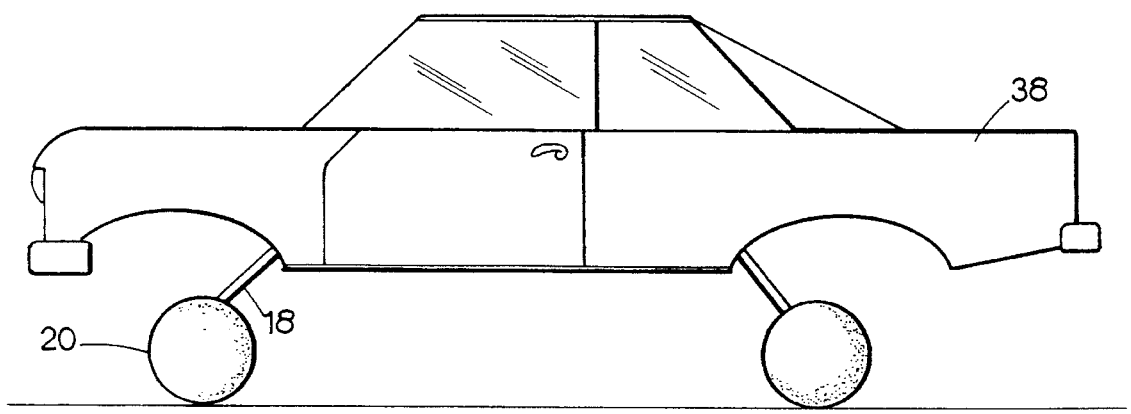
FIG. 6 is a side elevational view similar to FIG. 5, showing a vehicle, wheel support members and road wheel assemblies, but with the vehicle in a fully lifted attitude.
Figure 7:
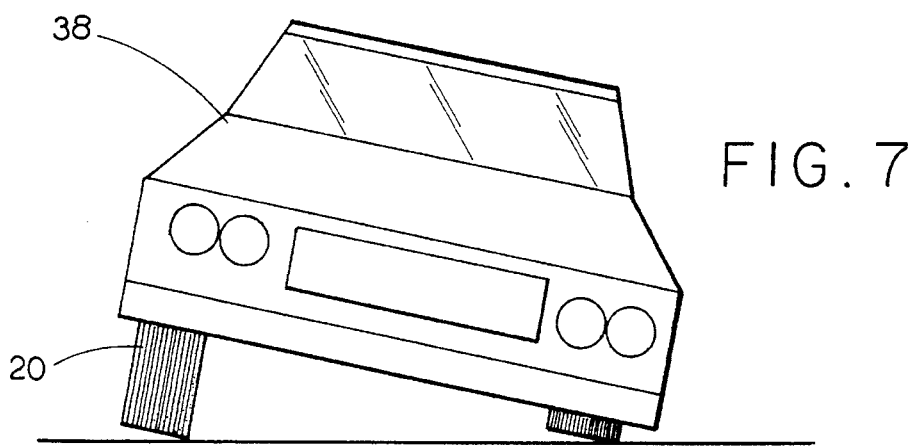
FIG. 7 is a front elevational view of an embodiment of the invention showing a vehicle, wheel support members and road wheel assemblies, with the vehicle fully tilted to one side; it may be similarly tilted to the opposite side.
Figure 8:
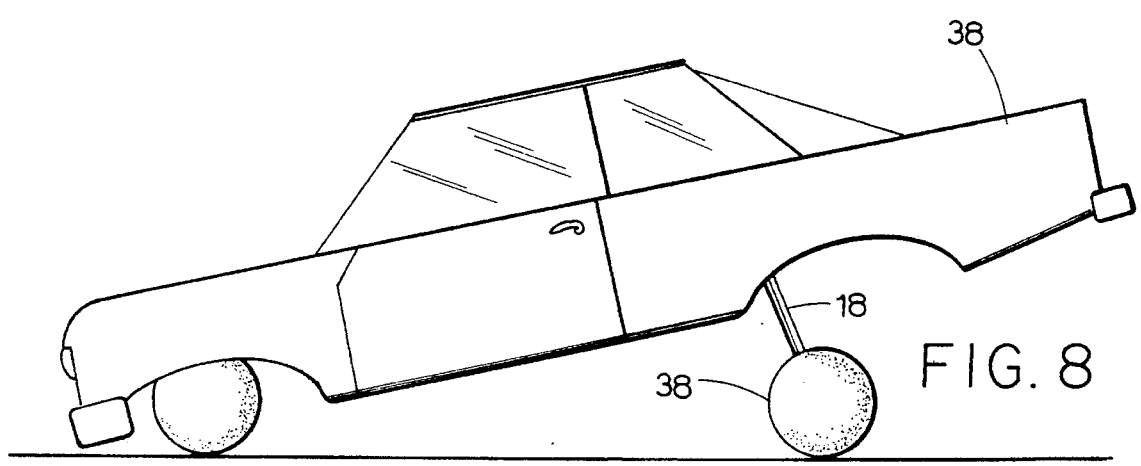
FIG. 8 is a side elevational view of an embodiment of the invention showing a vehicle, wheel support members and road wheel assemblies, and showing the vehicle with the back fully lifted.

The user of this invention may create many different illusions associated with the presentation of the user's vehicle 38 by adjusting the height of the wheels in various combination. For example, referring to FIG. 1, the user, by toggling the remote switches 36 such that elevating wheel Assemblies A, B and D, as designated on FIG. 2, the vehicle 38 appears to be cornering at great speed. Referring to FIG. 5, by not elevating any of the wheel assemblies, the vehicle 38 takes on a "lowrider" aura, commensurate with a powerful, sleek image. Referring to FIG. 6, by elevating all of the wheel assemblies, the vehicle 38 appears much larger than it is because it is much taller. Referring to FIG. 7, by elevating wheel assemblies A and B (or C and D), the vehicle 38 appears to be moving swiftly around a banked turn. Referring to FIG. 8, by elevating wheel assemblies B and C, the vehicle's uplifted rear end gives the appearance the vehicle 38 is decelerating rapidly.

The present invention is not intended to be limited to the embodiments described above, but to encompass any and all embodiments within the scope of the following claims.

I claim:

1. A model wheeled vehicle having independently adjusted wheel height with respect to the body, comprising:

a vehicle body;

a plurality of road wheels attached to said body; and a plurality of vehicle height adjustment apparatuses attached to said road wheels, there being one said apparatuses attached to one road wheel, each of said apparatuses comprising:

a motor providing a rotational output, and a suspension arm angularly displaced by said motor responsive to said rotational output, and having proximal and distal ends, said suspension arm connected to said rotational output at said proximal end, and one of said road wheels attached to said suspension arm at said distal end, whereby pivoting of said suspension arm moves an attached said road wheel vertically with respect to said vehicle body.

2. The model wheeled vehicle according to claim 1, further comprising a battery, conductors conducting energy from said battery to each said motor of said vehicle height adjustment apparatuses, and a switch controlling said conductors individually, whereby vehicle height is adjusted individually at each said road wheel.

3. The model wheeled vehicle according to claim 2, said conductors extending remotely from said body, and said switch being located remotely from said body.

4. The model wheeled vehicle according to claim 1, further comprising reduction gears connected to said motor, for reducing said rotational output relative to the speed of said motor, said motor and said reduction gears having friction and inertial forces, whereby wheel attitude is maintained after an associated said motor is deenergized due to said friction and said inertial forces.

5. A model wheeled vehicle having independently adjusted wheel height with respect to the body, comprising:

a vehicle body;

a plurality of road wheels attached to said body;

a plurality of vehicle height adjustment apparatuses attached to said road wheels, there being one of said apparatuses for each one road wheel, each of said apparatuses comprising:

a motor providing a rotational output, a suspension arm angularly displaced by said motor responsive to said rotational output, and having proximal and distal ends, said suspension arm connected to said rotational output at said proximal end, and one of said road wheels attached to said suspension arm at said distal end, whereby pivoting of said suspension arm moves an attached said road wheel vertically with respect to said vehicle body, and reduction gears connected to said motor, for reducing said rotational output relative to the speed of said motor, said motor and said reduction gears having friction and inertial forces, whereby wheel attitude is maintained after an associated said motor is deenergized due to said friction and said inertial forces; and a battery, conductors conducting energy from said battery to each said motor of said vehicle height adjustment apparatuses, and a switch controlling said conductors individually, whereby vehicle height is adjusted individually at each said road wheel, said conductors extending remotely from said body, and said switch being located remotely from said body.

\* \* \* \* \*